United States Patent
Dubief et al.

(10) Patent No.: US 12,507,722 B2
(45) Date of Patent: Dec. 30, 2025

(54) METHOD FOR ROASTING COFFEE BEANS

(71) Applicant: SOCIETE DES PRODUITS NESTLE S.A., Vevey (CH)

(72) Inventors: Flavien Dubief, Champagne (CH); Stefano Ceccaroli, Chavornay (CH)

(73) Assignee: Societe des Produits Nestle S.A., Vevey (CH)

( * ) Notice: Subject to any disclaimer, the term of this patent is extended or adjusted under 35 U.S.C. 154(b) by 760 days.

(21) Appl. No.: 17/414,001

(22) PCT Filed: Dec. 17, 2019

(86) PCT No.: PCT/EP2019/085768
§ 371 (c)(1),
(2) Date: Jun. 15, 2021

(87) PCT Pub. No.: WO2020/127360
PCT Pub. Date: Jun. 25, 2020

(65) Prior Publication Data
US 2022/0079203 A1    Mar. 17, 2022

(30) Foreign Application Priority Data
Dec. 17, 2018    (EP) .................................... 18212951

(51) Int. Cl.
*A23N 12/12*    (2006.01)
*A23F 5/04*    (2006.01)
(Continued)

(52) U.S. Cl.
CPC .............. *A23N 12/125* (2013.01); *A23F 5/04* (2013.01); *G01K 13/00* (2013.01); *G01N 33/0047* (2013.01); *H05B 1/0263* (2013.01)

(58) Field of Classification Search
CPC ...... A23N 12/125; A23N 12/08; A23N 12/12; A23F 5/04; G01K 13/00; G01K 1/02;
(Continued)

(56) References Cited

U.S. PATENT DOCUMENTS 2,307,710 A * 1/1943 Polin ...................... A23N 12/08
426/466
3,964,175 A * 6/1976 Sivetz ..................... A23F 5/046
34/589

(Continued)

FOREIGN PATENT DOCUMENTS

CN    105636461 A    6/2016
CN    106604646 A    4/2017
(Continued)

OTHER PUBLICATIONS

Auber Instruments Type K Thermocouple, 2012, pp. 1-4 (Year: 2012).*
(Continued)

*Primary Examiner* — Erik Kashnikow
*Assistant Examiner* — Luis Eugenio Diou Berdecia
(74) *Attorney, Agent, or Firm* — K&L Gates LLP

(57) ABSTRACT

The invention concerns an apparatus for roasting partially pre-roasted coffee beans comprising: —a vessel (1) to contain coffee beans, —an electrical heater (13) to heat coffee beans contained in the vessel, —at least one temperature sensor (23) to measure temperature in the vessel, —a control system (180) operable to control the heater, wherein the control system is configured to: —apply a roasting recipe dedicated to the roasting of partially pre-roasted beans comprising at least a temperature versus time profile, —measure the concentration of at least one volatile organic component (VOC) in the smoke produced in the vessel during the time the roasting recipe is applied, —detect an
(Continued)

increase of the measured concentration in function of time,
—stop heating if no increase of the measured concentration happens after a set reference time $t_1$.

9 Claims, 2 Drawing Sheets

(51) Int. Cl.
*G01K 13/00* (2021.01)
*G01N 33/00* (2006.01)
*H05B 1/02* (2006.01)

(58) Field of Classification Search
CPC .... G01N 33/0047; H05B 1/0263; G05B 1/01; G05B 11/01; G06F 11/3062; G06K 7/10
USPC .................................................. 426/233, 466
See application file for complete search history.

(56) References Cited

U.S. PATENT DOCUMENTS

| | | | | |
|---|---|---|---|---|
| 4,326,114 | A * | 4/1982 | Gerling | A23N 12/10 426/466 |
| 4,698,916 | A * | 10/1987 | Farber | A23N 12/08 34/586 |
| 4,860,461 | A * | 8/1989 | Tamaki | A23N 12/10 34/267 |
| 5,500,237 | A * | 3/1996 | Gell, Jr. | A23N 12/083 34/594 |
| 5,944,512 | A * | 8/1999 | Ludwig | A23N 12/125 99/473 |
| 5,958,494 | A * | 9/1999 | Tidland | A23N 12/083 426/523 |
| 6,195,912 | B1 * | 3/2001 | Moon | A23N 12/08 426/465 |
| 6,491,872 | B1 * | 12/2002 | Wick | G01N 33/48714 435/308.1 |
| 6,839,636 | B1 * | 1/2005 | Sunshine | G01N 29/022 702/30 |
| 7,285,300 | B1 * | 10/2007 | Allington | A23N 12/08 426/523 |
| 8,679,561 | B2 * | 3/2014 | Ludwig | A47J 42/52 426/523 |
| 2014/0314921 | A1 * | 10/2014 | Kuempel | H04L 67/10 426/433 |
| 2014/0314923 | A1 * | 10/2014 | Sewell | A23N 12/08 426/233 |
| 2014/0370181 | A1 * | 12/2014 | Young | A23F 5/04 426/507 |
| 2016/0183586 | A1 * | 6/2016 | Min | A23N 12/10 99/324 |
| 2016/0324180 | A1 | 11/2016 | Hay et al. | |
| 2017/0238593 | A1 * | 8/2017 | Shi | A23N 12/08 |
| 2017/0251691 | A1 * | 9/2017 | Shi | A23N 12/12 |
| 2017/0303731 | A1 * | 10/2017 | Tan | A23F 5/26 |
| 2017/0319002 | A1 * | 11/2017 | Tan | A23F 5/04 |
| 2017/0339973 | A1 * | 11/2017 | Shi | A47J 31/42 |
| 2018/0000108 | A1 * | 1/2018 | Boggavarapu | A47J 31/5251 |
| 2018/0255802 | A1 * | 9/2018 | Yamamoto | A23F 5/04 |

FOREIGN PATENT DOCUMENTS

| | | | |
|---|---|---|---|
| CN | 107950723 A | 4/2018 | |
| EP | 3311675 | 4/2018 | |
| GB | 191507954 A | 6/1916 | |
| KR | 20140107850 A * | 9/2014 | ............... A23F 5/04 |
| WO | 2016063177 | 4/2016 | |
| WO | 2016071165 A | 5/2016 | |
| WO | 2016083148 | 6/2016 | |

OTHER PUBLICATIONS

"Starbucks Roasting Method", Food Global Industry, vol. 10, Oct. 31, 2007, pp. 26-27.
Office Action Received for Application No. CN201980083346.3, mailed on Aug. 25, 2022, 7 Pages of Official Copy.

* cited by examiner

METHOD FOR ROASTING COFFEE BEANS

CROSS REFERENCE TO RELATED APPLICATIONS

The present application is a National Stage of International Application No. PCT/EP2019/085768, filed on Dec. 17, 2019, which claims priority to European Patent Application No. 18212951.0, filed on Dec. 17, 2018, the entire contents of which are being incorporated herein by reference.

FIELD OF THE INVENTION

The present invention relates to the roasting coffee beans with heated air, and more specifically to the roasting of partially pre-roasted beans, preferably in relatively small quantities of coffee beans, particularly suited for use in the home or in shops and cafes.

BACKGROUND OF THE INVENTION

Usually, the roasting of coffee beans consists in roasting green coffee beans. This roasting requires a certain time and generates a certain volume of smoke, particularly at the first stage of the roasting. Moreover roasting requires a certain knowledge to obtain the best roasting from various different green beans and to match the preferences of the final customers.

As a simpler alternative to the roasting of green beans, it has been proposed to roast partially roasted beans. These beans have been partially roasted at a manufacturing roasting plant up to a point that enables a second final roasting before consumption. The first partial roasting provides the advantage of shortening the final roasting, which can last few minutes only. Another advantage is that less smoke is generated during the final roasting. The use of partially roasted beans has been described in WO 03/082705, US 2013/180406, WO 2015/110337, WO 2015/162021.

Thanks to this alternative, roasting becomes easier for non-roasting experts and a new range of roasting apparatus can be proposed for use in the home or in shops and cafes. Such roasting apparatuses can be automatized enough so that operators without experience in roasting can launch the roasting operation.

Where a roasting apparatus is configured for roasting partially pre-roasted beans only, there is a risk that the user erroneously introduces green beans in the apparatus, particularly if the user is a non-expert. The problem is that the heating profile for partially pre-roasted beans is different from the heating profile starting from green beans. Using a heating profile that is not adapted to green beans presents the consequence that, at the end of the roasting process, the green beans may not be sufficiently roasted with the associated risk that these beans damage the device used to grind the roasted in a subsequent step and that the coffee extracted from these roasted and ground beans present a high level of acrylamide.

Similarly, when a roasting apparatus is operated by a non-expert, there is a risk that the user forgets to remove fully roasted beans from the apparatus at the end of the roasting operation and initiates a new roasting without these already roasted beans. The consequence is that these beans may burn and create a fire inside the apparatus. It may also happen that the user initiates a roasting operation with partially pre-roasted beans and stop the roasting process before it has reached its end for an unpredictable reason. The user restart the roasting later with a new roasting cycle initiated from the beginning. This restart of the roasting may lead to the above mentioned risk of fire or to the problem of a roasting that is not adapted to the beans leading to a poor final quality.

SUMMARY OF THE INVENTION

An object of the present invention is to improve the roasting of coffee beans in apparatuses implementing roasting of partially roasted beans.

It would be advantageous to provide a roasting apparatus avoiding risk of fire due to load of erroneous coffee beans such as green beans or fully roasted beans.

Objects of the invention are achieved by the apparatus for roasting coffee beans according to Claim 1, the method of Claim 9 and the computer program according to Claim 11.

In the present application, by "partially pre-roasted beans", it is understood beans having been obtained by heating green coffee beans and stopping said heating process before the end of the first crack. This definition includes beans having been obtained by heating green coffee beans and stopping said heating process before the beginning of the first crack.

In the present application, by "fully roasted beans", it is understood beans having been roasted after the second crack.

In a first aspect of the invention, there is provided an apparatus for roasting coffee beans comprising:
 a vessel to contain coffee beans,
 a heater to heat coffee beans contained in the vessel,
 at least one temperature sensor to measure temperature in the vessel,
 a control system operable to control the heater,
wherein the control system is configured to:
 apply a roasting recipe dedicated to the roasting of partially pre-roasted beans comprising at least a temperature versus time profile,
 measure the concentration of at least one volatile organic component (VOC) in the smoke produced in the vessel during the time the roasting recipe is applied,
 detect an increase of the measured concentration in function of time,
 stop heating if no increase of the measured concentration happens after a set reference time $t_1$.

In the vessel coffee beans are heated and preferably mixed to homogenise heating through the beans.

Mixing can be obtained with a fluidic bed of hot air or mechanically with stirring blades or through rotation of a rotating drum.

Preferably the vessel is hot air fluid bed chamber. Within such a vessel, heated air is forced through a screen or a perforated plate under the coffee beans with sufficient force to lift the beans. Heat is transferred to the beans as they tumble and circulate within this fluidized bed.

Alternatively the vessel can be a drum chamber wherein the coffee beans are tumbled in a heated environment. The drum chamber can consist of a horizontal rotating drum or the drum chamber can comprise stirring blades to tumble the coffee beans in a heated environment.

As a source of heating, preferably the apparatus comprises an electrical heater. This electrical heater comprises usually an electrical resistance. In addition, preferably, the heater comprises an air driver to circulate air heated by the heater. In some apparatus, the air driver is not necessary, for example when the apparatus comprises stirring blades or is a rotating drum.

An electrically powered heater presents the advantage that the air pollutants produced during the roasting are pollutants generated from the heating of coffee beans themselves and not from the burning of gases as it happens when the source of heating is a gas burner using natural gas, propane, liquefied petroleum gas (LPG) or even wood.

The apparatus comprises at least one temperature sensor to measure temperature in the vessel. The sensor can be positioned inside the volume of the vessel or near the inlet of heated air in the vessel.

The apparatus comprises a control system operable to control the electrical heater in order to apply a temperature versus time profile inside the vessel. Usually, this control is implemented based on the measure of at least one temperature sensor positioned in the vessel in feedback loop control.

The temperature versus time profile corresponds to a roasting recipe dedicated to the roasting of partially pre-roasted beans. Usually, the time length of such a profile is shorter than the time length of the profile dedicated to the roasting of green coffee beans.

In addition, the control system is configured to measure the concentration of at least one volatile organic component (VOC), preferably at least one component from the list of: $CO$, $CO_2$, $NO$, $NO_2$, $SO_2$, formaldehyde in the smoke produced in the vessel during the time the roasting recipe is applied.

Preferably the sensor for VOCs is positioned inside the vessel or downstream the vessel, for example at the outlet of the vessel The control system is configured to detect an increase of the measured concentration in function of time.

In the preferred embodiment, the concentration of CO and/or $CO_2$ is measured.

In the process of roasting coffee beans starting from green coffee beans up to a roasting level that enables the preparation of a coffee beverage by infusion with water, the coffee beans go through several stages and in particular through:
- a first stage where the level of emissions remains low, then
- a first crack step where exothermic internal reactions occur and components like CO, $CO_2$, and other VOCs are produced and emitted, then
- a second stage where the level of emissions decreases,
- a second crack step where exothermic internal reactions occur and VOCs are emitted again.

Depending if green beans or partially pre-roasted beans are heated, the time the first crack step occurs is different:
- it is longer for the green beans than for the partially pre-roasted beans, usually by at least 2 minutes,
- there is no first crack for fully roasted beans.

It means that green beans and fully roasted beans can be differentiated from partially pre-roasted beans in that, by applying the same roasting profile, the first crack happens later for the green beans compared to the partially roasted beans or not at all for the fully roasted beans. As a result, by setting a reference time at which the first crack of partially pre-roasted beans usually happens, it is possible to detect if it is effectively partially pre-roasted beans present in the vessel and being roasted.

The control system is configured to stop the heater if no increase of the measured concentration of CO, $CO_2$, . . . happens after a set reference time. Actually, by setting the reference time to the time the first crack of partially pre-roasted beans happens, if no decrease of consumption happens that time, it means that green beans or fully roasted beans have been introduced or even no beans have been introduced inside the vessel. By security, the heating is stopped.

A message can be displayed to inform the operator and induce him to heck the nature of the beans introduced inside the vessel.

Advantageously objects of the invention are solved since the above detection of the time the first decrease of the consumption of electrical power by the heater occurs enables to verify the nature of the beans introduced inside the vessel.

The reference time $t_1$ can be defined according to the nature of the partially pre-roasted beans produced in order to be used in the roasting apparatus applying the roasting recipe dedicated to the roasting of partially pre-roasted beans. Preferably, the reference time for the first increase of the measured concentration is set to 5 minutes.

Actually, it has been observed that for green beans, the first increase of the measured concentration is usually of at least 5 minutes.

It may be possible that, erroneously the operator introduces inside the vessel beans pre-roasted up to a point between the end of the first crack and the beginning of the second crack, or that he forgets to remove beans from a previous roasting operation from the vessel. In that case, by applying the roasting profile, there is no first crack, but the second crack happens very rapidly after starting heating these beans. In case such an error happens, the issue of fire is less critical than for fully roasted beans, but the final roasting does not lead to an optimised product and such a roasting is not recommended.

In a preferred embodiment, in order to avoid such a roasting, the control system can be configured to stop the electrical heater if the first increase of the measured concentration happens before a set reference time $t_0$. Preferably, this reference time $t_0$ can be set to 3 minutes.

In one embodiment, the control system is configured to obtain identification of the coffee beans introduced in the vessel by the user. The identification of beans relate to the nature of the beans which has the direct impact on the process of roasting the beans. Generally, the nature relates to the origin of the beans (Arabica, Robusta, . . . ).

The identification of the beans can be obtained:
- by manual input from the user,
- from an identification device configured to read automatically identification means from a beans package presented by the user.

In all cases, the beans are introduced inside the vessel by the user, which explains the problem that the beans in the vessel may not be partially pre-roasted beans.

The control system can be configured to obtain the roasting recipe corresponding to the identified coffee beans before the step of applying the roasting recipe. The roasting recipe can be obtained:
- from a memory,
- from a server,
- from the identification device.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures.

DETAILED DESCRIPTION OF THE DRAWINGS

Figure 1:
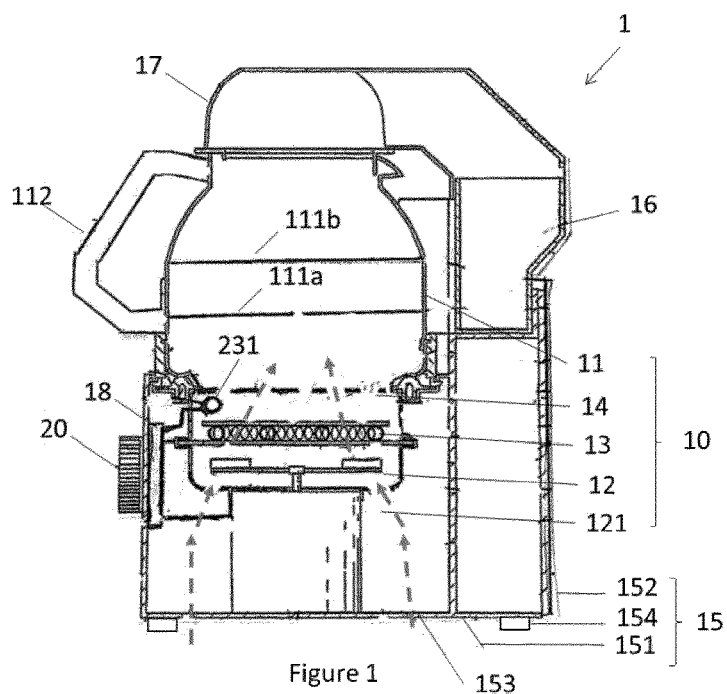
FIG. 1 is a schematic drawing of a general roasting apparatus enabling the implementation of the method of the present invention.

FIG. 1 shows an illustrative view part of a roasting apparatus 1. Functionally, the roasting apparatus 1 is operable to roast coffee beans hold in a vessel 11 by means of a flow of hot air introduced inside this vessel. At a first level, the apparatus comprises: a housing 15, a roasting unit 10 and a control system 180. These components will now be sequentially described.

Housing of Roasting Apparatus

The housing 15 houses and supports the aforementioned components and comprises a base 151 and a body 152. The base 151 being for abutment with a support surface, preferably through feet 154 that provide a gap between the base and the support surface. The body 152 is for mounting thereto the components.

Roasting Unit of Roasting Apparatus

The roasting unit 10 is operable to receive and roast coffee beans.

The roasting unit 10 typically comprises at a second level of the roasting apparatus 1: a vessel 11, an air flow driver 12, a heater 13, which are sequentially described.

The vessel 11 is configured to receive and hold the coffee beans introduced by the operator. A removable cover 17 enables the introduction and removal of beans. The bottom of the vessel is configured to enable air to pass through, specifically it can be a perforated plate 14 on which the beans can lie and through which air can flow upwardly.

A chaff collector 16 is in flow communication with the vessel 1 to receive chaffs that progressively separate from the beans and due to their light density are blown off to the chaff collector.

The vessel 11 comprises a handle 112 in order to enable the user to remove the vessel from the housing 15 and get the roasted beans.

The air flow driver 12 is operable to generate a flow of air in direction of the bottom of the vessel. The generated flow is configured to heat the beans and to agitate and lift the beans that is creating a fluidising bed of air. As a result, the beans are homogenously heated. Specifically, the air flow driver can be a fan powered by a motor 121. Air inlets 153 can be provided inside the base 151 of the housing in order to feed air inside the housing, the air flow driver blowing this air in direction of the vessel 11.

In an alternative embodiment of the roaster, not represented, the vessel can comprise a rotating device to rotate the beans inside the vessel. In that case, a simple flow of air can be provided, the rotating device enabling the homogeneous heating of the beans.

The heater 13 is operable to heat the flow of air generated by the air flow driver 12. In the illustrated embodiment, the heater is an electrical resistance being positioned between the fan and the perforated plate 14 with the result that the flow of air is heated before it enters the vessel 11 to heat and to lift the beans.

The heater 13 and/or the air flow driver is/are operable to apply a roasting profile to the beans, this roasting profile being defined as a curve of temperature against time.

Control System of Roasting Apparatus

Figure 2:
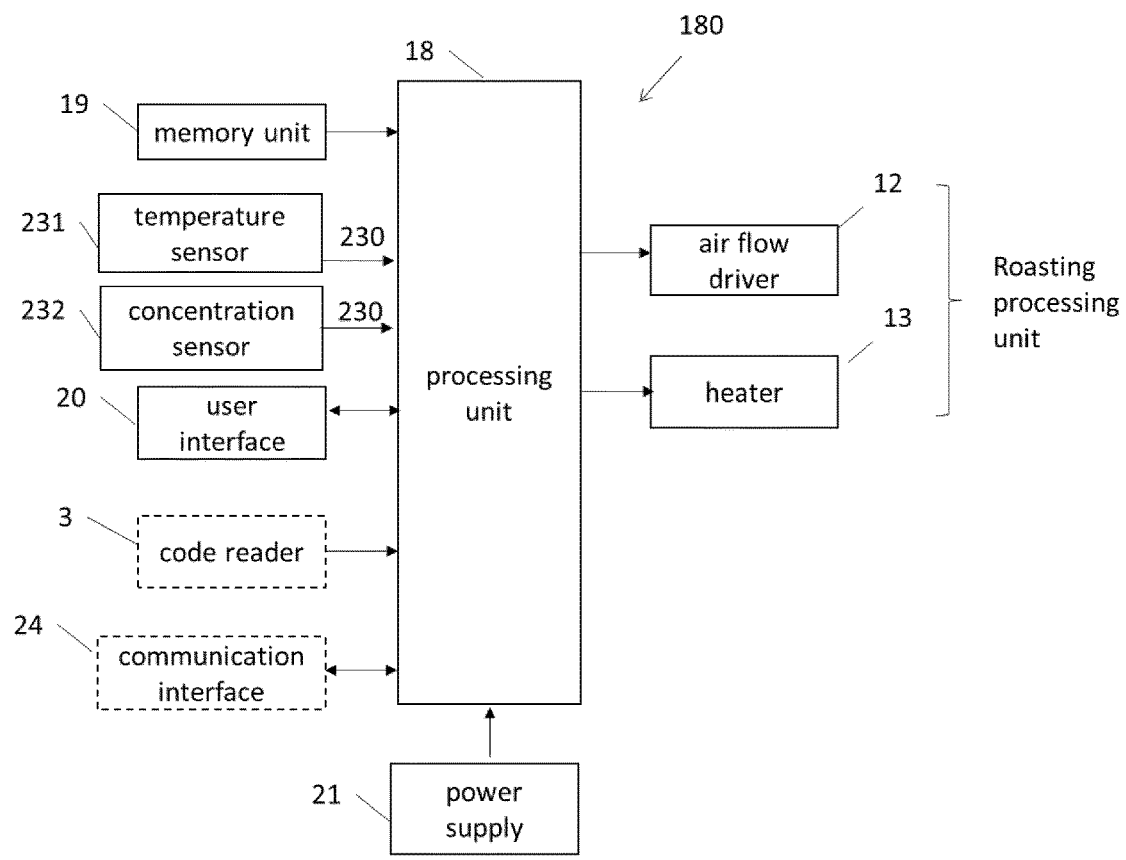
FIG. 2 shows a block diagram of a control system of the general apparatus according to FIG. 1.

With reference to FIGS. 1 and 2, the control system 180 will now be considered: the control system 180 is operable to control the components of the roasting unit to roast coffee beans. The control system 180 typically comprises at a second level of the roasting apparatus: a user interface 20, a processing unit 18, at least one sensor 231, 232, a power supply 21, a memory 19, optionally a code reader 3, optionally a communication interface 24 for remote connection.

The user interface 20 comprises hardware to enable a user to interface with the processing unit 18, by means of user interface signal. More particularly, the user interface receives commands from a user, the user interface signal transfers the said commands to the processing unit 18 as an input. The commands may, for example, be information about the nature of the beans introduced in the vessel (such as origins, reference of supplier), an instruction to execute a roasting process (start the process) and/or to adjust an operational parameter (desired level of final roasting, quantity of beans to be roasted) of the roasting apparatus 1 and/or to power on or off the roasting apparatus 1. The processing unit 18 may also output feedback to the user interface 20 as part of the roasting process, e.g. to indicate the roasting process has been initiated or that a parameter associated with the process has been selected or to indicate the evolution of a parameter during the process or to create an alarm.

The hardware of the user interface may comprise any suitable device(s), for example, the hardware comprises one or more of the following: buttons, such as a joystick button, knob or press button, joystick, LEDs, graphic or character LDCs, graphical screen with touch sensing and/or screen edge buttons. The user interface 20 can be formed as one unit or a plurality of discrete units.

A part of the user interface can also be on a mobile app when the apparatus is provided with a communication interface 24 as described below.

The at least one sensor 231, 232 is operable to provide an input signal to the processing unit 18 for monitoring of the roasting process and/or a status of the roasting apparatus. The input signal can be an analogue or digital signal. The sensors 231, 232 typically comprise at least one temperature sensor 231 and optionally one or more of the following sensors: beans level sensor associated with the vessel 11, position sensor associated with the vessel 11 and/or the chaff collector 16.

In addition, the sensors 231, 232 comprises a sensor 232 to measure the concentration of at least one VOC component. This sensor 232 is usually positioned at the outlet of vessel. If the outlet of the vessel is connected to a smoke treating unit, this sensor 232 is positioned upstream any filter or catalytic converter so that the measure is not changed by the smoke treatment.

The processing unit can comprise a code reader 3 associated with e.g. a system to read code on beans packaging.

The processing unit can comprise a communication interface 24 for data communication of the roasting apparatus 1 with another device and/or system, such as a server system and/or a mobile device. The communication interface 24 can be used to supply and/or receive information related to the coffee beans roasting process, such as roasting process information, nature of the beans, quantity of beans. The communication interface 24 may comprise a first and second communication interface for data communication with several devices at once or communication via different media.

The communication interface 24 can be configured for cabled media or wireless media or a combination thereof, e.g.: a wired connection, such as RS-232, USB, 120, Ethernet define by IEEE 802.3, a wireless connection, such as wireless LAN (e.g. IEEE 802.11) or near field communication (NFC) or a cellular system such as GPRS or GSM. The communication interface 24 interfaces with the processing unit 18, by means of a communication interface signal. Generally the communication interface comprises a separate processing unit (examples of which are provided above) to control communication hardware (e.g. an antenna) to interface with the master processing unit 18. However, less complex configurations can be used e.g. a simple wired connection for serial communication directly with the processing unit 18.

The processing unit 18 generally comprise memory, input and output system components arranged as an integrated circuit, typically as a microprocessor or a microcontroller. The processing unit 18 may comprises other suitable integrated circuits, such as: an ASIC, a programmable logic device such as a PAL, CPLD, FPGA, PSoC, a system on a chip (SoC), an analogue integrated circuit, such as a controller. For such devices, where appropriate, the aforementioned program code can be considered programed logic or to additionally comprise programmed logic. The processing unit 18 may also comprise one or more of the aforementioned integrated circuits. An example of the later is several integrated circuits is arranged in communication with each other in a modular fashion e.g.: a slave integrated circuit to control the user interface 20 in communication with a master integrated circuit to control the roasting unit 10.

The processing unit 18 generally comprises a memory unit 19 for storage of instructions as program code and optionally data. To this end the memory unit typically comprises: a non-volatile memory e.g. EPROM, EEPROM or Flash for the storage of program code and operating parameters as instructions, volatile memory (RAM) for temporary data storage. The memory unit may comprise separate and/or integrated (e.g. on a die of the semiconductor) memory. For programmable logic devices the instructions can be stored as programmed logic.

The instructions stored on the memory unit 19 can be idealised as comprising a coffee beans roasting program. The coffee beans roasting program can be executed by the processing unit 18 in response to the said input such as the commands from the user interface 20 and/or the signal of the sensors 231, 232 like temperature sensor 231, concentration sensor 232, beans level or quantity sensor, code reader 3. Execution of the coffee beans roasting program causes the processing unit 18 to control the following components: the heater 13 and the air flow driver 12.

The processing unit 18 is operable to:
receive an input, i.e. the commands from the user interface 20 and/or the signal of the sensors (e.g. the temperature sensor 231 associated with the vessel 11, the beans level sensor) and/or the code reader 3,
process the input according to roasting program code (or programmed logic) stored on the memory unit 19 and/or imputed from an external source such as the communication interface 24,
provide an output, which is the roasting process. More specifically the output comprises the operation of at least the heater 13 and/or the air flow driver 12.

Operation of the roasting unit is usually closed-loop control using the input signal from the temperature sensor 231 as feedback to apply the temperature versus time profile to the coffee beans.

The control system 180 is operable to apply this coffee beans roasting process by controlling the air flow driver 12 and/or the heater 13 usually using signal of the temperature probe 231. The temperature measured by the temperature probe 231 is used to adapt the power of the heater 13 and/or the power of the air driver 12 in a feedback loop in order to apply the roasting recipe R to the beans.

Depending on the type of control, the heater 13 can be powered at one pre-determined power, meaning its temperature is constant, and in that case the power of the air driver 12 can be controlled based on the temperature monitored at the probe 231 in order to vary the time of contact of the flow air through the heater during its movement.

Alternatively, the air driver 12 can be powered at one pre-determined power, meaning the flow rate of air is constant, and in that case the power of the heater 13 can be controlled based on the temperature monitored at the probe 231 in order to heat more or less air during its passage through the heater.

In a last alternative, both heater 13 and air driver 12 can be controlled based on the monitoring of the temperature by probe 231.

A part of the roasting program is based on a roasting recipe comprising a temperature versus time profile to be applied to the beans. The coffee beans roasting program is configured for roasting partially pre-roasted beans.

Figure 3:
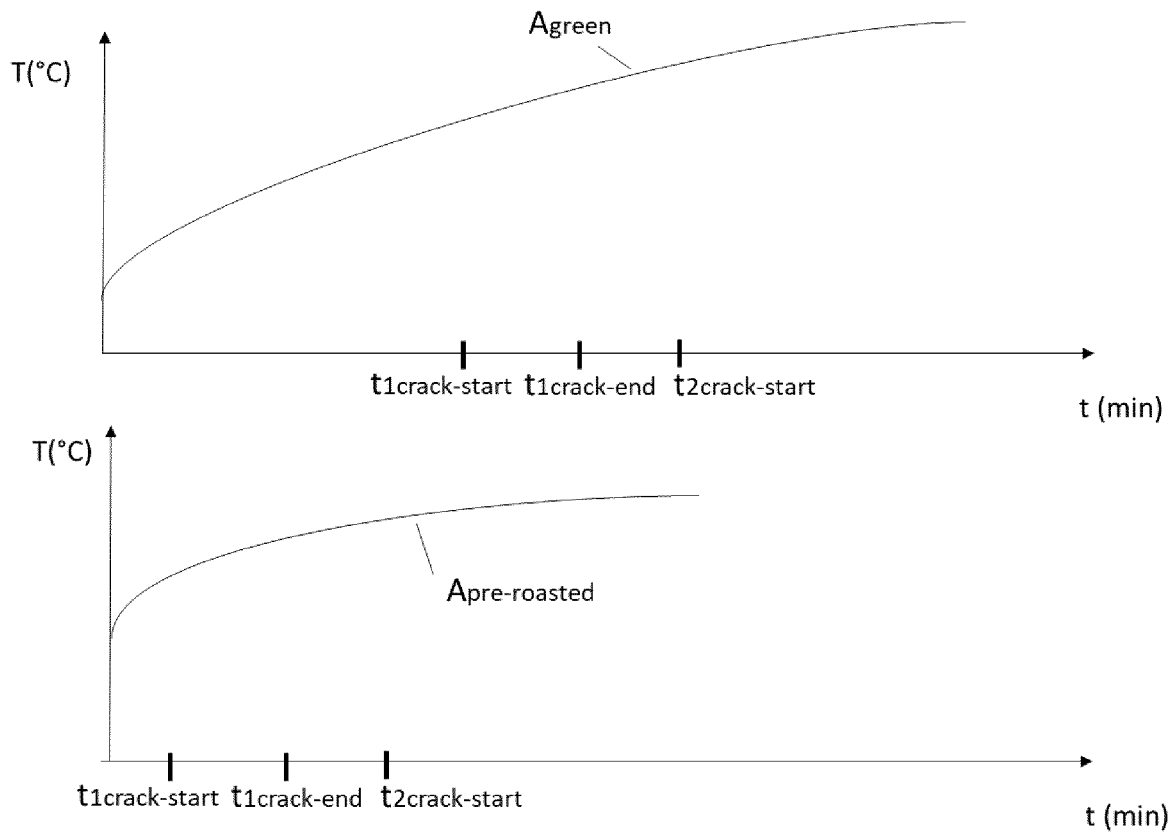
FIG. 3 represents schematically curves of heating profile applied to green beans and to partially pre-roasted beans.

FIG. 3 illustrates the heating profiles (temperature versus time) for roasting green coffee beans (curve $A_{green}$) and partially pre-roasted beans of the same origin (curve $A_{pre\text{-}roasted}$) in the apparatus 1. $t_{1,crack.start}$ is the time corresponding to the start of the first crack, $t_{1,crack.end}$ is the time corresponding to the end of the first crack, $t_{2,crack.start}$ is the time corresponding to the start of the second crack.

As illustrated in curve $A_{pre\text{-}roasted}$, when the beans have been partially pre-roasted, the heating profile is shorter in time: the first part of the curve $A_{green}$ is not applied, yet the heating profile starts before $t_{1,crack\text{-}end}$. Accordingly, in the roasting apparatus 1, the control system is configured to apply a roasting recipe or roasting program dedicated to the roasting of partially pre-roasted beans such as illustrated by the heating profile of curve $A_{pre\text{-}roasted}$.

The power supply 21 is operable to supply electrical energy to the said controlled components and the processing unit 18. The power supply 21 may comprise various means, such as a battery or a unit to receive and condition a main electrical supply. The power supply 21 may be operatively linked to part of the user interface 20 for powering on or off the roasting apparatus 1.

Based on another part of the instructions stored on the memory unit 19, the processing unit 18 is operable to:
measure the concentration of at least one VOC component in the smoke produced in the vessel during the time the roasting recipe is applied,
detect an increase of the measured concentration in function of time,
stop heating if no increase of the measured concentration happens after a set reference time $t_1$.

During the roasting operation, the input 230 of the concentration of at least one VOC component, preferably in the list of: $CO$, $CO_2$, $NO$, $NO_2$, $SO_2$, formaldehyde, in the smoke produced in the vessel is monitored by the processing unit 18.

Based on the measure of the concentration during the time the roasting recipe is applied, the processing unit 18 is configured to detect an increase of this concentration in function of time.

Preferably, the increase of the concentration to be detected is sufficiently important to correspond to the production of VOC components during the first crack of coffee beans.

Based on the follow-up of the concentration, the processing unit 18 is configured to stop the electrical heater if no increase of concentration happens after a set reference time $t_1$.

Actually, if no increase of concentration happens in a relatively short time after the start of the process, it means that no partially pre-roasted beans have been introduced inside the apparatus and that the vessel 11 holds either green beans or fully roasted beans or even no beans at all.

As illustrated in the curves of FIG. 3, while applying the same heating profile to partially pre-roasted coffee beans and green beans of same origins (that is the partially pre-roasted coffee beans have been obtained from said green beans), the first crack of green beans happens later than the first crack of the partially pre-roasted coffee beans.

Figure 4:
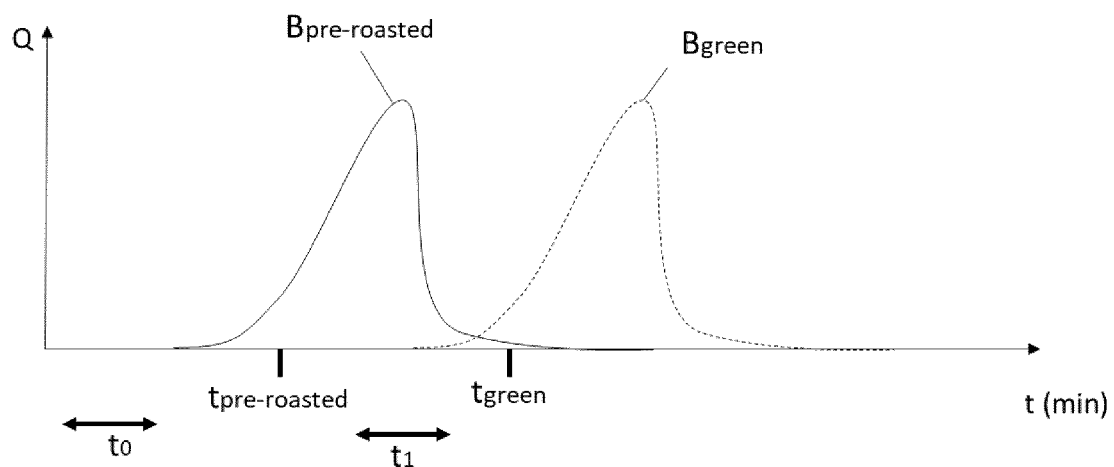
FIG. 4 represents schematically a first curve of the electrical power consumption of the heater during the step of roasting a partially pre-roasted coffee beans and a second curve of the electrical power consumption of the heater during the step of roasting green beans.

FIG. 4 illustrates schematically the measured concentration Q of CO in the smoke produced in the vessel during the heating of:

green beans (Curve $B_{green}$), and
partially pre-roasted coffee beans obtained from the same origin as the green beans (Curve $B_{pre-roasted}$)

according to the heating profile (temperature versus time) of curve $A_{pre-roasted}$ of FIG. 3.

In both cases, the curve shows a peak corresponding to the emission of CO. The concentration of CO starts increasing at the time the first crack of the beans happens and goes on increasing until it reaches its maximum after the second crack.

The increase of concentration of CO corresponding to the first crack of the partially pre-roasted beans happens at time $t_{pre-roasted}$, that is earlier than the time $t_{green}$ corresponding to the increase of concentration of CO and the first crack of the green beans.

By setting a reference time $t_1$ greater than $t_{pre-roasted}$ but smaller than $t_{green}$, it is possible to discriminate partially pre-roasted beans from green beans. In general (but it may depend from one type of partially pre-roasted beans to another), the reference time $t_1$ is set to 5 minutes.

If fully roasted beans roasted up to after the second crack had been introduced in the vessel in place of partially roasted beans, then no increase of concentration of CO would be detected at all before or after the time $t_1$ similarly to green beans.

If beans roasted up to a point between the end of the first crack and the beginning of the second crack, then the emission of CO would be immediately detected that is before $t_{pre-roasted}$. Accordingly, by setting a reference time $t_0$ smaller than $t_{pre-roasted}$, it is possible to discriminate these beans from partially pre-roasted beans. In general (but it may depend from one type of partially pre-roasted beans to another), the reference time $t_0$ is set to 3 minutes.

Finally depending on the type of beans identified in the vessel, the control system is configured to continue or stop the heater 13.

If the beans are identified as partially pre-roasted beans, the heating according to the roasting recipe can be pursued.

If the beans are identified as green beans or fully roasted beans, the heating is stopped and an alert is sent to the user, for example through the user interface 20.

As a result, beans are introduced inside the vessel by the user and information about their type can be supplied by the user to the processing unit in the more advanced mode (either manually or automatically with a code). Yet, whatever the mode, since the beans are introduced manually inside the vessel, there is a risk that the user does not introduce partially pre-roasted beans inside the vessel, and in particular forgets to remove fully roasted beans from a precedent operation or introduces green beans inside the vessel.

The apparatus of the present invention presents the advantage of avoiding any risk of fire due to inadvertence of the user without implementing complex and costly devices.

In the step of applying a roasting recipe comprising at least a temperature versus time profile by controlling the electrical heater and/or the air flow driver based on the measure of the temperature sensor, the roasting recipe can be a recipe by default for roasting partially pre-roasted beans or can be a recipe dedicated to the partially pre-roasted beans identified in the optional identification step and derived from an optional step of obtaining the dedicated roasting recipe for these identified beans.

This dedicated roasting recipe can be obtained from the memory unit 19 of the roasting apparatus or downloaded from a server through the communication interface 24 or read by the code reader during the optional step of code reading, the recipe being part of the information related to the identification of the beans.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS roaster 1
roasting unit 10
vessel 11
handle 112
fan 12
motor 121
heater 13
perforated plate 14
housing 15
base 151
body 152
air inlet 153
feet 154
chaff collector 16
cover 17
processing unit 18
control system 180
memory 19
user interface 20
power supply 21
sensor 23
input 230
temperature sensor 231 concentration sensor 232
communication interface 24
code reader 3

The invention claimed is:

1. A method of roasting coffee beans in a vessel, the method comprising:
applying, by an electrical heater controlled by a control system, a roasting recipe dedicated to roasting partially pre-roasted beans, wherein the roasting recipe comprises a temperature versus time profile, wherein applying the roasting recipe comprises controlling the electrical heater to apply the temperature versus time profile inside the vessel based on a measure of at least one temperature sensor positioned in the vessel, wherein a temperature measured inside the vessel is used to adapt a power of the electrical heater in a feedback loop,
measuring a concentration of at least one volatile organic component in smoke produced in the vessel during the applying of the roasting recipe,
detecting an increase of the concentration in function of time,
stopping, by the control system, heating when a first part of the increase of the concentration is detected before a set reference time to, wherein the set reference time to is 3 minutes, and
stopping, by the control system, heating when no increase of the concentration is detected after a set reference time $t_1$, wherein the set reference time $t_1$ is 5 minutes.

2. The method according to claim 1, wherein a sensor for measuring the concentration of at least one volatile organic component is positioned inside the vessel.

3. The method according to claim 1, wherein a sensor for measuring the concentration of at least one volatile organic component is positioned at an outlet of the vessel.

4. The method according to claim 1, wherein the electrical heater comprises an air driver.

5. The method according to claim 1, wherein the at least one volatile organic component, for which the concentration is measured, comprises one or more of $CO$, $CO_2$, $NO$, $NO_2$, $SO_2$, or formaldehyde.

6. The method according to claim 1, comprising identifying, by the control system, the type of coffee beans introduced in the vessel, wherein the identifying comprises receiving manual input from a user.

7. The method according to claim 1, comprising identifying, by the control system, the type of coffee beans introduced in the vessel, wherein the identifying comprises reading, by an identification device, an identifier from a package that contained the coffee beans.

8. The method according to claim 4, wherein the air driver circulates air heated by the heater.

9. The method according to claim 8, wherein the feedback loop adapts a power of the air driver based on the temperature measured inside the vessel.

* * * * *